US012227390B2

(12) United States Patent
Laughton et al.

(10) Patent No.: US 12,227,390 B2
(45) Date of Patent: Feb. 18, 2025

(54) ELEVATOR GUIDE

(71) Applicant: ELEVATOR SAFETY COMPANY, Owings Mills, MD (US)

(72) Inventors: Andrew James Laughton, Ellicott City, MD (US); Jeffrey Lachica Geroso, Baltimore, MD (US)

(73) Assignee: ELEVATOR SAFETY COMPANY, Owings Mills, MD (US)

(*) Notice: Subject to any disclaimer, the term of this patent is extended or adjusted under 35 U.S.C. 154(b) by 19 days.

(21) Appl. No.: 17/579,895

(22) Filed: Jan. 20, 2022

(65) Prior Publication Data

US 2022/0144589 A1 May 12, 2022

Related U.S. Application Data

(62) Division of application No. 16/373,834, filed on Apr. 3, 2019, now Pat. No. 11,261,057.

(51) Int. Cl.
*B66B 7/04* (2006.01)
*B66B 7/02* (2006.01)

(52) U.S. Cl.
CPC .............. *B66B 7/046* (2013.01); *B66B 7/023* (2013.01); *B66B 7/048* (2013.01)

(58) Field of Classification Search
CPC .......... B66B 7/046; B66B 7/023; B66B 7/048
See application file for complete search history.

(56) References Cited

U.S. PATENT DOCUMENTS 1,854,976 A * 4/1932 Brady .................... B66B 7/048 187/406
3,669,222 A * 6/1972 Takamura .............. B66B 7/046 187/406
5,289,902 A * 3/1994 Fujita ..................... B66B 7/042 187/346
5,632,358 A * 5/1997 Maeda .................... B66B 7/048 187/410
5,984,053 A * 11/1999 Lee ........................ B66B 7/046 182/141

(Continued)

OTHER PUBLICATIONS

"Sliding guide shoes for car frame and counterweight", Wittur GmbH, Jan. 24, 2002, fifteen (15) pages (NPL 1).

(Continued)

*Primary Examiner* — Michael A Riegelman
(74) *Attorney, Agent, or Firm* — Merek, Blackmon & Voorhees, LLC

(57) ABSTRACT

An elevator guide having a base attached to an elevator component, a guide riding along a portion of a rail and a spring biasing the guide in contact with the rail. The guide includes one or more of the following: (i) a guide support member operably associated with the guide for movably supporting the guide so that the guide can move toward and away from a corresponding surface of the rail member wherein the guide support member has a plurality of spring engagement sections configured to vary a system effective spring rate; (ii) a roller including a non-metallic rim molded about a bearing; (iii) two independently adjustable stops and, (iv) an opening adjustment member mounted about a notch in the base to vary the distance between the base and the rail. The opening adjustment member has a width and/or depth greater than a width and/or depth of the notch.

15 Claims, 12 Drawing Sheets

(56) References Cited

U.S. PATENT DOCUMENTS

| | | | | |
|---|---|---|---|---|
| 6,050,370 | A * | 4/2000 | Jung | B66B 7/046<br>187/409 |
| 6,062,347 | A * | 5/2000 | Traktovenko | B66B 7/046<br>267/140 |
| 7,562,749 | B2 * | 7/2009 | Race, Sr. | B66B 7/042<br>187/409 |
| 8,251,186 | B2 * | 8/2012 | Webster | B66B 7/04<br>187/401 |
| 8,950,041 | B2 * | 2/2015 | Palsson | E05D 15/063<br>16/105 |
| 9,163,445 | B2 * | 10/2015 | Andren | E05D 15/0634 |
| 9,708,161 | B2 * | 7/2017 | Geroso | B66B 7/046 |
| 11,261,057 | B2 * | 3/2022 | Laughton | B66B 7/023 |
| 2005/0279585 | A1 * | 12/2005 | Race | B66B 7/046<br>187/250 |
| 2014/0158473 | A1 * | 6/2014 | Arai | B66B 7/048<br>187/406 |
| 2015/0198871 | A1 * | 7/2015 | Piraino | F16M 13/02<br>248/309.1 |
| 2015/0321885 | A1 * | 11/2015 | Laughton | B66B 7/046<br>187/410 |
| 2017/0057785 | A1 * | 3/2017 | Geroso | B66B 7/046 |
| 2018/0093863 | A1 * | 4/2018 | Hawkins | B66B 7/023 |
| 2020/0317472 | A1 * | 10/2020 | Laughton | B66B 7/048 |
| 2022/0144589 | A1 * | 5/2022 | Laughton | B66B 7/048 |

OTHER PUBLICATIONS

"Isolated Roller Guide Shoes WRG200, WRG300", Wittur GmbH, Aug. 12, 2002, sixteen (16) pages (NPL 2).

* cited by examiner

ELEVATOR GUIDE

FIELD OF THE INVENTION

The present invention is directed to elevator guides used for guiding the movement of a component (e.g., an elevator car and/or counter weight) along elevator guide rails installed in a shaft or hoist way of a building structure.

BACKGROUND OF THE INVENTION

Elevator guides typically guide movement of a component (e.g., an elevator car or a counterweight) along a pair of opposing elevator guide rails located in a shaft or hoist way of a building structure. It is customary to employ a plurality of elevator guides to guide movement of the component along the elevator guide rails as the component moves in a shaft or hoist way of a building structure. Typically, two of the elevator guides are secured to the upper portion of the component in such a manner as to engage the corresponding elevator guide rails and two elevator guides are secured to the lower portion of the component to engage the corresponding guide rails. Typically, elevator guides have a plurality of rollers/wheels or other guide components that engage and travel along the corresponding elevator guide rail.

Springs are typically used to control movement of a roller or other guide member. Known systems/methods used to alter the spring rate of an elevator guide require replacement of the spring or require an additional component or components connected to the spring to vary the spring rate of the spring. This is undesirable as the spring must be changed or additional components are required.

Existing elevator guides having two stops that control movement of a roller or other guide away from an elevator guide rail are extremely limited as neither of the two stops can be independently adjustable. Rather, adjustment of one stop causes or results in adjustment of the other stop. This design is undesirable and unnecessarily limited.

Elevator guides having rollers/wheels typically include a roller/wheel having a metallic rim for receiving a tread of the roller/wheel. This design precludes the roller/wheel from being manufactured in a cost-effective manner. Further, this design complicates the manufacturing process considerably. Moreover, this design increases the weight of the elevator guide and can adversely impact ride quality.

Known elevator guides that include a member to vary the spacing between a notch or opening in the front face of the base of the elevator guide and a corresponding portion of an elevator guide rail require a member which is inserted into and covers the faces of the notch or opening in the front face of the base. These known designs are inferior as the connection to the base is inadequate/inferior. Further, as in the present invention, if alignment scores/notches/slots/recesses/indicia or other alignment members are provided or formed in one or more of the vertical faces of the notch or opening of the base to properly align the elevator guide to a corresponding elevator rail, the insert will obstruct the alignment members.

Typically, each elevator guide includes three or six rollers/wheels or other guide members. The present invention is not limited to elevator guides having a particular number of rollers/wheels or other guide members. Rather, the present invention can be used in elevator guides having differing numbers of rollers/wheels or other guide components.

OBJECTS AND SUMMARY OF THE INVENTION

An object of the present invention is to provide a novel and unobvious elevator guide that guides movement of a component (e.g., an elevator car or a counterweight) along a pair of opposing elevator guide rails located in a shaft or hoist way of a building structure.

Another object of a preferred embodiment of the present invention is to provide an elevator guide that can readily vary the effective system spring rate of a system having one or more springs/resilient members without changing the springs/resilient members of a given system and without providing one or more additional components to the given system that act on the springs/resilient members to vary the effective system spring rate.

A further object of a preferred embodiment of the present invention is to provide an elevator guide that can readily vary the effective system spring rate of a system having one or more springs/resilient members merely by altering the position of the springs/resilient members.

Yet another object of a preferred embodiment of the present invention is to provide an elevator guide with two independently adjustable stops for each guide support arm to control movement of each guide support arm away from a corresponding portion of a corresponding elevator guide rail.

Still another object of a preferred embodiment of the present invention is to provide an elevator roller guide with one or more rollers/wheels having a non-metallic wheel/roller rim for receiving a tread of the roller/wheel.

Yet still another object of a preferred embodiment of the present invention is to provide a roller guide with one or more rollers/wheels wherein a wheel/roller rim for the one or more rollers/wheel is formed from molding and during the molding process the wheel/roller rim is fixed to a bearing of the roller/wheel.

A further object of a preferred embodiment of the present invention is to provide a roller guide with one or more rollers/wheels wherein a non-metallic wheel/roller rim for the one or more rollers/wheels.

Another object of a preferred embodiment of the present invention is to provide an elevator guide having a base and a recess formed in a lower surface of the base to receive a notch adjustment member to vary the spacing between the base and an elevator guide rail.

A further object of a preferred embodiment of the present invention is to provide an elevator guide having a base with a notch for receiving a portion of an elevator guide rail wherein one or more alignment members are formed in the notch and a notch adjustment member is connected to the base to vary the spacing between the base and the portion of an elevator guide rail without obstructing the one or more alignment members.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, a preferred embodiment of the present invention is directed to an elevator guide configured to ride along an elevator rail having a base member and a rail member. The rail member of the elevator rail includes a front face, a first side and a second side. The rail member of the elevator rail further extends substantially perpendicular to the base member of the elevator rail. The elevator guide includes a base configured to be attached to a component that rides on one or more elevator rails. A first guide is configured to ride along one of a front face, a first side and a second side of a rail member of an elevator rail. A first spring biases the first guide in contact with the at least one of the front face, the first side and the second side of the rail member of the elevator rail. A first guide support member has a connection portion rotatably connected to the base so that the first guide support member can rotate about an axis relative to the base. The first guide support member further includes a guide connection portion for connecting the first guide support member to the first guide for movably supporting the first guide on the base so that the first guide can move toward and away from a corresponding surface of the rail member of the elevator rail. The first guide support member is configured to allow a position of the first spring relative to the axis to be varied to vary an effective system spring rate.

Another preferred embodiment of the present invention is directed to an elevator guide configured to ride along an elevator rail having a base member and a rail member. The rail member of the elevator rail having a front face, a first side and a second side. The rail member of the elevator rail extends substantially perpendicular to the base member of the elevator rail. The elevator guide includes a base configured to be attached to a component that rides on one or more elevator rails. A first guide is configured to ride along one of a front face, a first side and a second side of a rail member of an elevator rail. A first biasing member biases the first guide in contact with the at least one of the front face, the first side and the second side of the rail member of the elevator rail and a first guide support member has a connection portion rotatably connected to the base so that the first guide support member can rotate about an axis relative to the base. The first guide support member further includes a guide connection portion for connecting the first guide support member to the first guide for movably supporting the first guide on the base so that the first guide can move toward and away from a corresponding surface of the rail member of the elevator rail. The elevator guide further includes a first stop and a second stop. The first stop and the second stop each provide a limit that the first guide support member can rotate away from a corresponding portion of the rail member of the elevator rail. The first stop and the second stop are independently adjustable and the first stop differs in at least one respect from the second stop.

A further preferred embodiment of the present invention is directed to an elevator guide configured to ride along an elevator rail having a base member and a rail member. The rail member of the elevator rail has a front face, a first side and a second side. The rail member of the elevator rail extends substantially perpendicular to the base member of the elevator rail. The elevator guide includes a base configured to be attached to a component that rides on one or more elevator rails. The base has a notch extending through a front face of the base to receive a portion of the rail member of the elevator rail. The notch has a rear face, a first side face and a second side face. The bottom of the base includes an adjustment recess extending along the rear face, the first side face and the second side face of the notch. A first guide is configured to ride along one of a front face, a first side and a second side of a rail member of an elevator rail. A first biasing member biases the first guide in contact with the at least one of the front face, the first side and the second side of the rail member of the elevator rail. A first guide support member has a connection portion connected to the base so that the first guide support member can move relative to the base. The first guide support member further includes a guide connection portion for connecting the first guide support member to the first guide for movably supporting the first guide on the base so that the first guide can move toward and away from a corresponding surface of the rail member of the elevator rail. A notch adjustment member operably associated with the adjustment recess of the base for adjusting at least one dimension of the base relative to the rail member of the elevator rail.

Still another embodiment of the present invention is directed to an elevator guide configured to ride along an elevator rail having a base member and a rail member, the rail member of the elevator rail having a front face, a first side and a second side. The rail member of the elevator rail extends substantially perpendicular to the base member of the elevator rail. The elevator guide includes a base configured to be attached to a component that rides on one or more elevator rails. A first roller is configured to ride along one of a front face, a first side and a second side of a rail member of an elevator rail. A first biasing member biases the first roller in contact with the at least one of the front face, the first side and the second side of the rail member of the elevator rail and a first guide support member has a connection portion rotatably connected to the base so that the first guide support member can rotate about an axis relative to the base. The first guide support member further includes a roller connection portion for connecting the first guide support member to the first roller for movably supporting the first roller on the base so that the first roller can move toward and away from a corresponding surface of the rail member of the elevator rail. The first roller includes a roller tread that rides along a corresponding surface of the rail member of the elevator rail. The first roller includes a non-metallic roller rim having a recess for receiving the roller tread and a bearing. The non-metallic roller rim is connected to the bearing.

Yet still another embodiment of the present invention is directed to an elevator roller guide configured to ride along an elevator rail having a base member and a rail member. The rail member of the elevator rail having a front face, a first side and a second side. The rail member of the elevator rail extends substantially perpendicular to the base member of the elevator rail. The elevator roller guide includes a base configured to be attached to a component that rides on one or more elevator rails. A roller configured to ride along one of a front face, a first side and a second side of a rail member of an elevator rail. At least one biasing member biasing the roller in contact with the at least one of the front face, the first side and the second side of the rail member of the elevator rail. The elevator roller guide further includes at least one of the following: (i) a roller support member operably associated with the roller for movably supporting the roller so that the roller can move toward and away from a corresponding surface of the rail member wherein the roller support member has a plurality of biasing member engagement sections configured to allow a position that the at least one biasing member contacts the roller support member to be varied to vary an effective system spring rate; (ii) a roller including a non-metallic rim molded about a roller bearing and configured to receive a roller tread; (iii) a first stop and a second stop that are independently adjustable and operably associated with a roller support supporting the roller to control movement of the roller; and, (iv) an opening adjustment member detachably connected to a base of the roller guide about a notch formed in the base of the roller guide to receive a portion of the rail member of the elevator rail to vary the distance between the base of the roller guide and a portion of the rail member of the elevator rail, the opening adjustment member has a width greater than a width of said notch or a depth greater than said notch.

DETAILED DESCRIPTION OF THE PREFERRED EMBODIMENTS OF THE INVENTION

The preferred forms of the invention will now be described with reference to FIGS. 1-12. The appended claims are not limited to the preferred forms and no term and/or phrase used herein is to be given a meaning other than its ordinary meaning unless it is expressly stated that the term and/or phrase shall have a special meaning. The term "spring" as used herein shall mean any and all resilient devices that can be pressed or pulled but return to their former shape when released. The term "effective system spring rate" as used herein shall be defined by $SK_{eff}=F/X$ with "$SK_{eff}$" being the effective system spring rate of the system or the assembly having the resilient device(s) in a particular operating position on the elevator guide, F being the force applied to the wheel/roller or other guide member and X being the resultant deflection or movement of the wheel/roller or other guide member away from a corresponding portion of an elevator rail.

The preferred embodiments illustrate elevator guides that utilize three rollers/wheels as the guide members that guide a component (e.g., an elevator car or counterweight) along opposing elevator rails. However, guide members other than rollers/wheels can be used. Further, the number of rollers/wheels or other guide members can be altered as desired. For example, and without limitation, the elevator guide can include six rollers/wheels or guide members.

FIGS. 1-12

Figure 1:
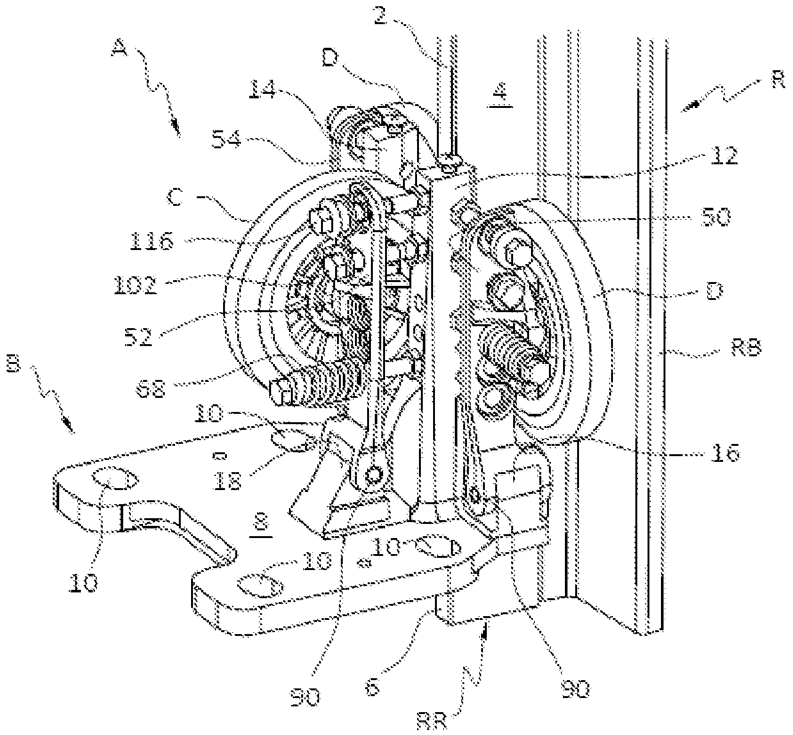
FIG. 1 is a perspective view of an elevator guide formed in accordance with a preferred embodiment of the present invention mounted about an elevator rail.

Referring to FIGS. 1 to 12, a preferred elevator roller guide A and components thereof are illustrated in one of many possible configurations. Referring to FIG. 1, elevator roller guide A is mounted about an elevator rail R. Elevator rail R includes a base member RB and a rail member RR. Rail member RR has a front face 2, a first side 4 and a second side 6. Rail member RR extends perpendicular or substantially perpendicular to the base member RB.

Elevator roller guide A includes a base B, a face roller or wheel C and pair of side rollers or wheels D. Base B includes a horizontally extending member 8 having four openings 10 that receive fasteners to attach roller guide A to the component that rides along the elevator rails. Base B further includes a pair of vertically extending members or towers 12 and 14.

Base B further includes three support arm connection portions 16, 18 and 20. Referring to, for example, FIG. 3, base B includes a notch or recess 22 formed in a front face of base B to receive a corresponding portion of rail member RR of an elevator rail R. Preferably, notch 22 is substantially U-shaped. Base B includes a recess 24 formed in a bottom surface 26 of base B. Recess 24 extends along and outwardly from three sides (i.e., left side, right side and rear side) of notch or recess 22 as seen in, for example, FIGS. 3 and 8. Preferably, recess 24 is substantially U-shaped. Preferably, recess 24 has a width and a depth greater than a width and a depth, respectively of notch 22.

Figure 3:
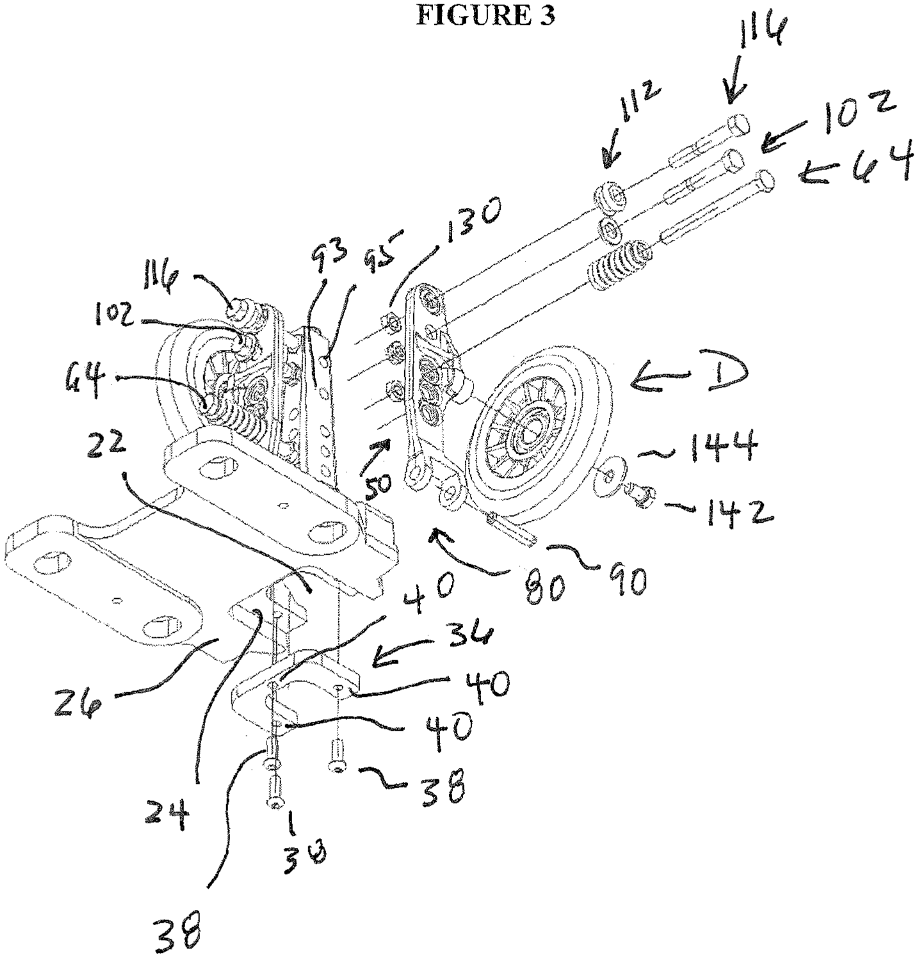
FIG. 3 is a partially exploded perspective view of a portion of the elevator guide illustrated in FIG. 1 as seen from a lower vantage point.
Figure 8:
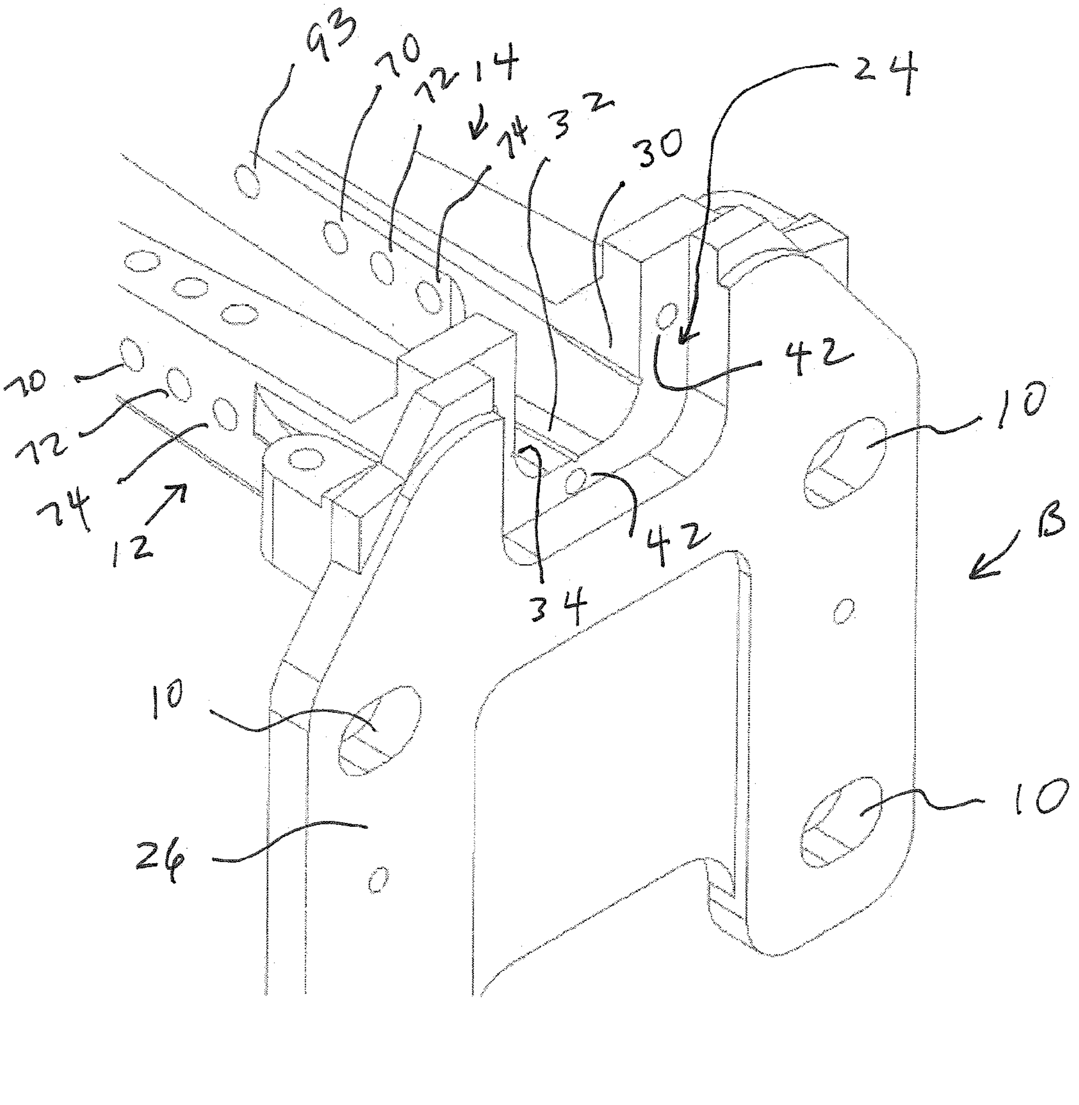
FIG. 8 is a perspective view of a portion of the base of the elevator guide illustrated in FIG. 1.
Figure 9:
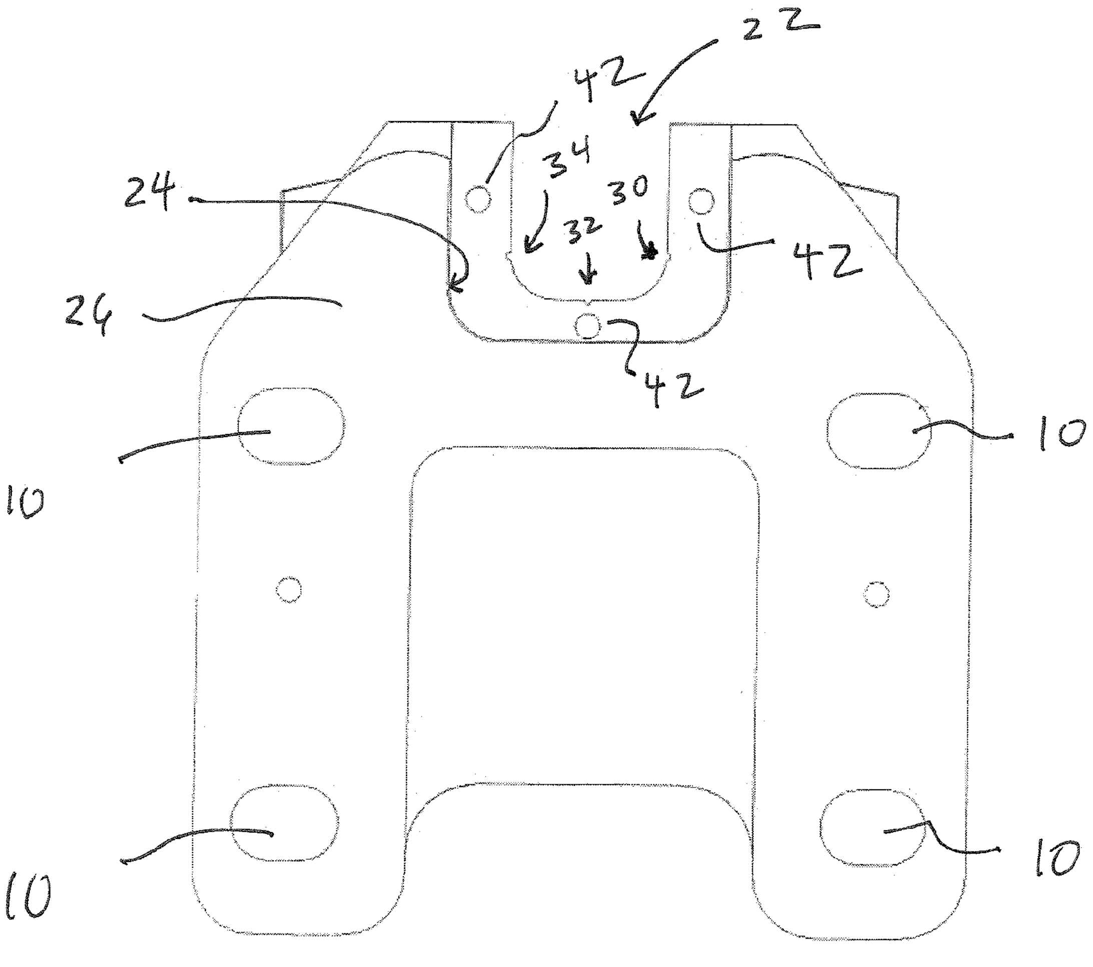
FIG. 9 is a bottom view of a portion of the elevator guide illustrated in FIG. 1.

As seen in FIGS. 8 and 9, notch or recess 22 includes alignment members 30, 32 and 34 to allow an individual to properly orient and/or align guide A relative to elevator rail R. Alignment members 30, 32 and 34 can take the form of scores, notches, slots, recesses, indicia or any other suitable alignment mechanism. Referring to FIG. 3, insert 36 is inserted into recess 24 and detachably connected to base member 8 by fasteners 38. Insert 36 is vertically offset from alignment members 30, 32 and 34 so that alignment members 30, 32 and 34 are readily visible from above when the insert to attached to base member 8. Three threaded or non-threaded bores 40 may extend through insert 36 and three threaded openings 42 may be formed in an upper surface of recess 24 to facilitate attachment of insert 36 to base member 8 using fasteners 38. Insert 36 is preferably U-shaped and preferably extends inwardly from left side, right side and rear side of notch 22 to vary the width dimension and depth dimension of notch 22. More specifically, insert 36 preferably decreases each of the following: (i) the spacing between base B and front face 2 of rail member RR; (ii) the spacing between base B and the side face 4 of rail member RR; and, (iii) the spacing between base B and the side face 6 of rail member RR. However, it will be readily appreciated that insert 36 can be configured to only vary the spacing between base B and front face 2. Alternatively, insert 36 can be configured to only vary the spacing between base B and side faces 4 and 6 or only between base B and face 4 or only between base B and face 6. For example, insert 36 can be configured such that portions of insert 36 corresponding to the right side and rear side of notch 22 are vertically aligned with the right side and rear side of notch 22, while the portion corresponding to the left side of notch 22 extends inwardly from the left side of notch 22.

Guide A includes support arms 50, 52 and 54 pivotally mounted on connection portions 16, 18 and 20, respectively of base B. Support arms 50, 52 and 54 each pivot about an axis to allow the corresponding guide member to move towards and away from the corresponding portion of rail member RR. Support arms 50, 52 and 54 are preferably identical or similar in construction so only support arm 50 will be discussed in detail.

Figure 2:
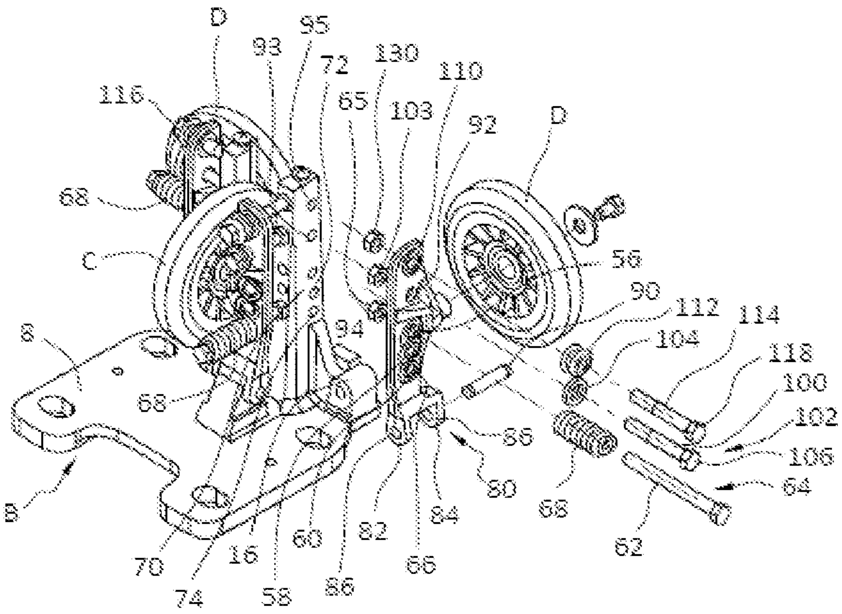
FIG. 2 is a partially exploded perspective view of the elevator guide illustrated in FIG. 1.
Figure 4:
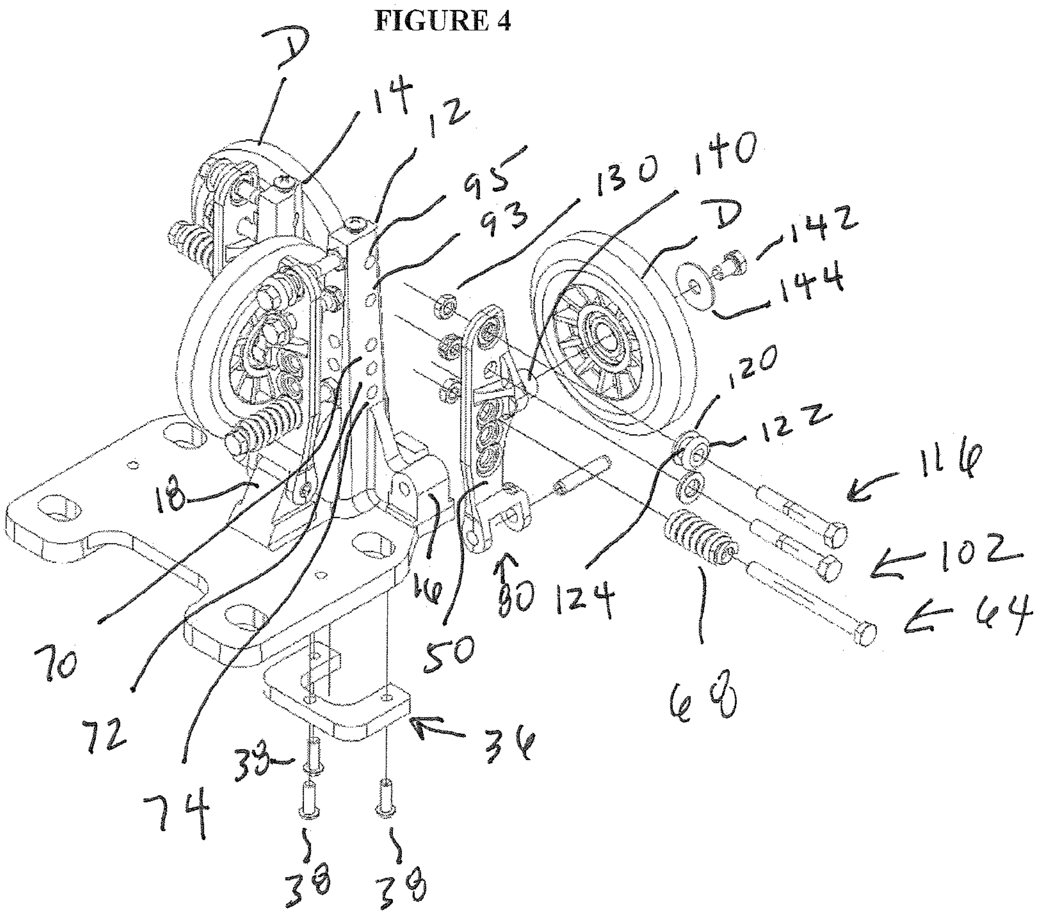
FIG. 4 is a partially exploded perspective view of the elevator guide illustrated in FIG. 1.
Figure 5:
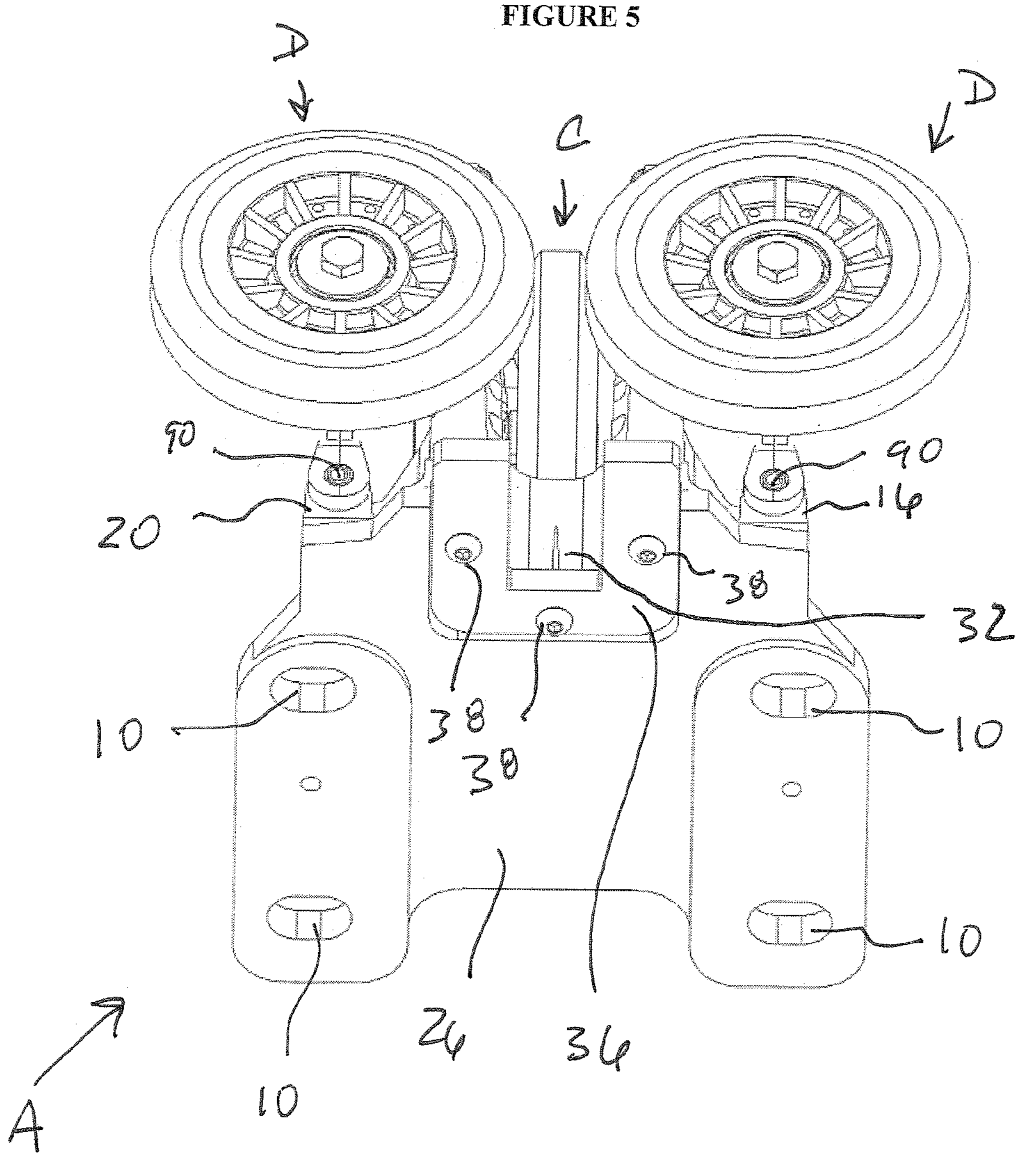
FIG. 5 is a perspective view of the elevator guide illustrated in FIG. 1 taken from a lower vantage point.
Figure 6:
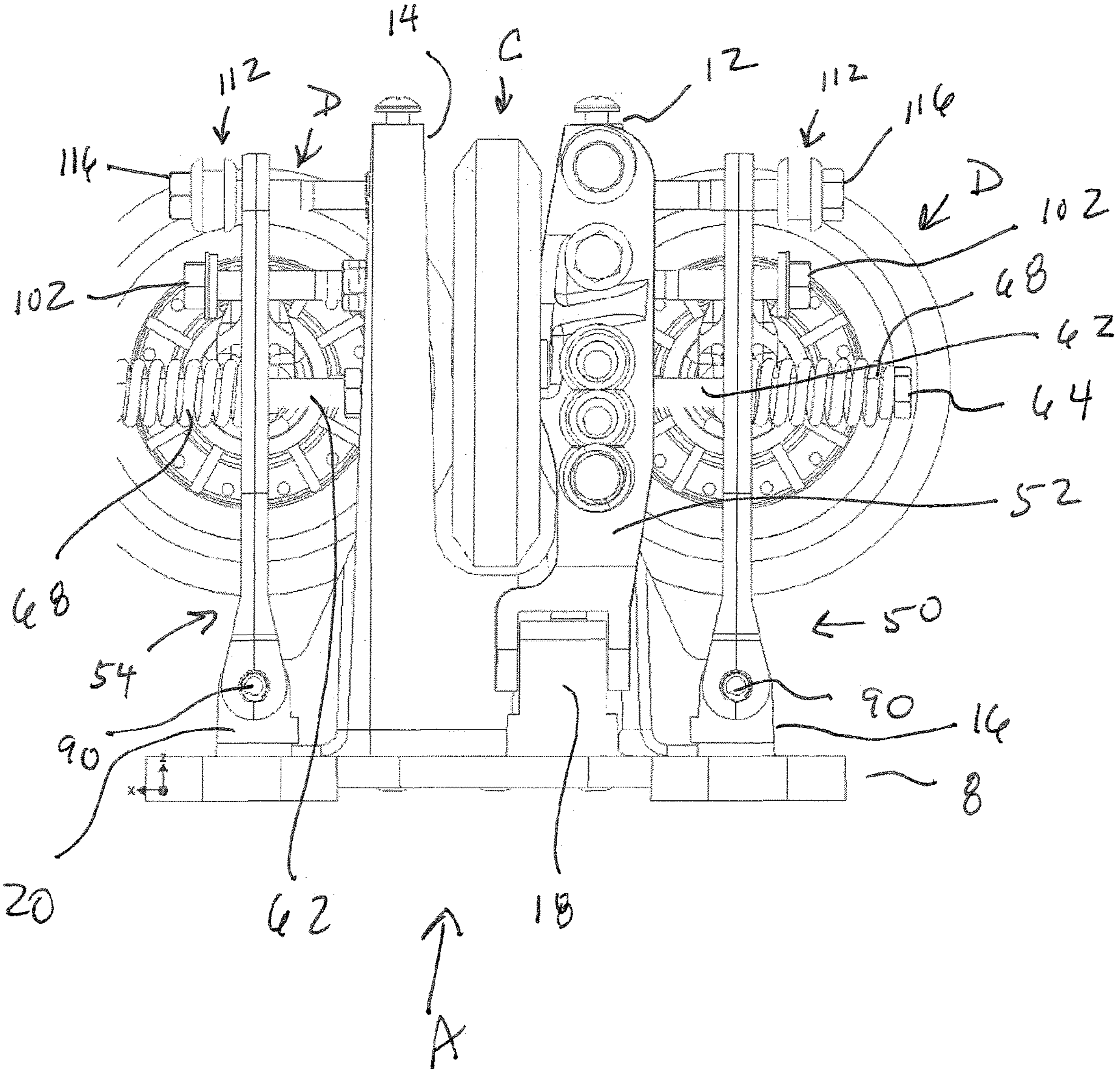
FIG. 6 is a fragmentary, side elevational view of the elevator guide illustrated in FIG. 1.
Figure 7:
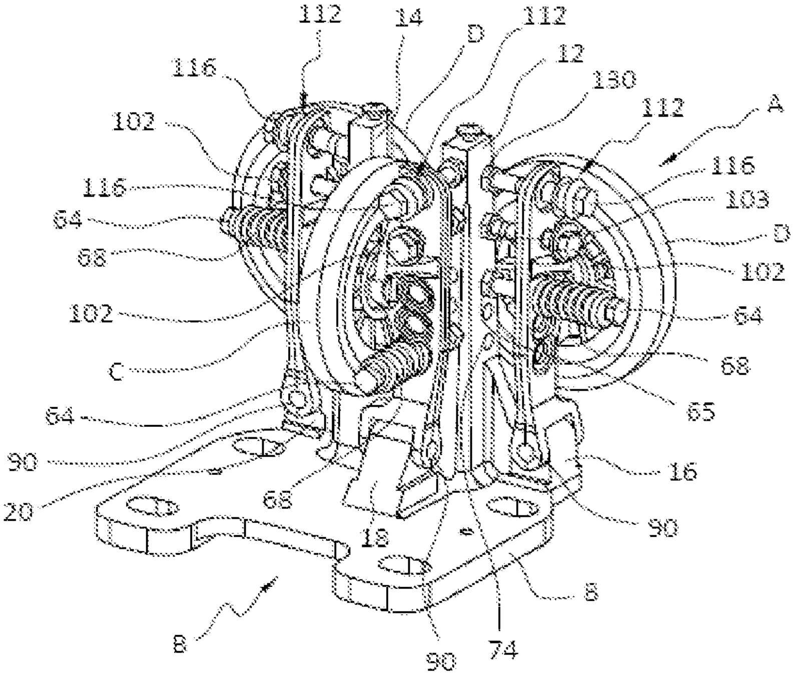
FIG. 7 is a perspective view of the elevator guide illustrated in FIG. 1.

Referring to, for example, FIGS. 2 to 4, support arm 50 includes three vertically spaced openings 56, 58 and 60 for receiving shaft 62 of a bolt 64 having a threaded inner end onto which a nut 65 can be threaded on. Openings 56, 58 and 60 are sized to be sufficiently larger than the diameter of shaft 62 to allow support arm 50 to move a predetermined distance away from and towards tower 12. A circular recess 66 can surround each of openings 56, 58 and 60 to receive an inner portion/end of spring 68. Tower 12 includes three vertically spaced internally threaded openings 70, 72 and 74 that are horizontally aligned with openings 56, 58 and 60, respectively to receive a threaded innermost end of shaft 62. Openings 70, 72 and 74 can extend partially or completely through tower 12.

Arm 50 includes a substantially U-shaped lower end 80 having spaced legs 82 and 84 each having an opening 86 that extends through the corresponding leg. Legs 82 and 84 are spaced from each other a sufficient distance to receive connection member 16 of base member 8. A bore extends through connection member 16. A pin or fastener 90 extends into openings 86 of each of legs 82 and 84 and the through bore of member 16 to rotatably connect lower end 80 of support arm 50 to base member 8. This configuration allows support arm 50 to rotate about a longitudinal axis of pin or fastener 90.

Support arm 50 further includes vertically spaced stop openings 92 and 94 each extending through support arm 50. Tower 12 includes internally threaded, vertically spaced openings 93 and 95. Openings 93 and 95 can extend partially or completely through tower 12. Openings 93 and 95 are horizontally aligned with stop openings 92 and 94, respectively. Stop opening 92 receives a shaft 100 of bolt 102. An inner end of shaft 100 is threaded to allow an inner end to be threaded through nut 103 and into opening 93 of tower 12 to adjustably fix bolt 102 to tower 12. A washer 104 is mounted on shaft 100 adjacent or in direct contact with bolt head 106. A rubber or elastomeric skin or layer can be formed on or attached to the innermost vertically extending surface of washer 104. Preferably, the rubber or elastomeric skin/layer has a thickness of approximately 1/16 of an inch. However, the thickness of the rubber or elastomeric skin/layer may be varied as desired. The rubber or elastomeric skin/layer maintains washer 104 in a desired position on shaft 100 as the rubber or elastomeric skin/layer is configured to grip the outer circumference of shaft 100 of bolt 102.

A circular recess 110 preferably surrounds opening 94 in support arm 50 to receive an inner portion of resilient member 112 which is mounted about shaft 114 of bolt 116 adjacent or in direct contact with bolt head 118. Preferably, resilient member 112 is configured to compress approximately 1/4 of an inch. However, the extent to which resilient member 112 can be compressed may be varied as desired. Resilient member 112 can be formed to have two spaced conically or cylindrically shaped face members 120 and 122 and an inner cylindrical member 124 extending between face members 120 and 122. Cylindrical member 124 can have a diameter less than an outermost diameter of each of members 120 and 122. Face members 120 and 122 may be formed from metal, plastic or an elastomeric/resilient material and member 124 can be formed from rubber, an elastic material or other resilient material. Inner through bores of members 120, 122 and/or 124 when formed from a suitable material can be configured to grip shaft 114 to maintain resilient member 112 on a desired portion of shaft 114. An inner end of shaft 114 is inserted through opening 94, through nut 130 and into opening 95 formed in tower 12 to adjustably attach bolt 116 to tower 12.

Support arm 50 includes a wheel or roller mount portion 140 having an internally threaded bore. A bolt 142 and washer 144 rotatably connect roller/wheel D to portion 140 of support arm 50.

Figure 10:
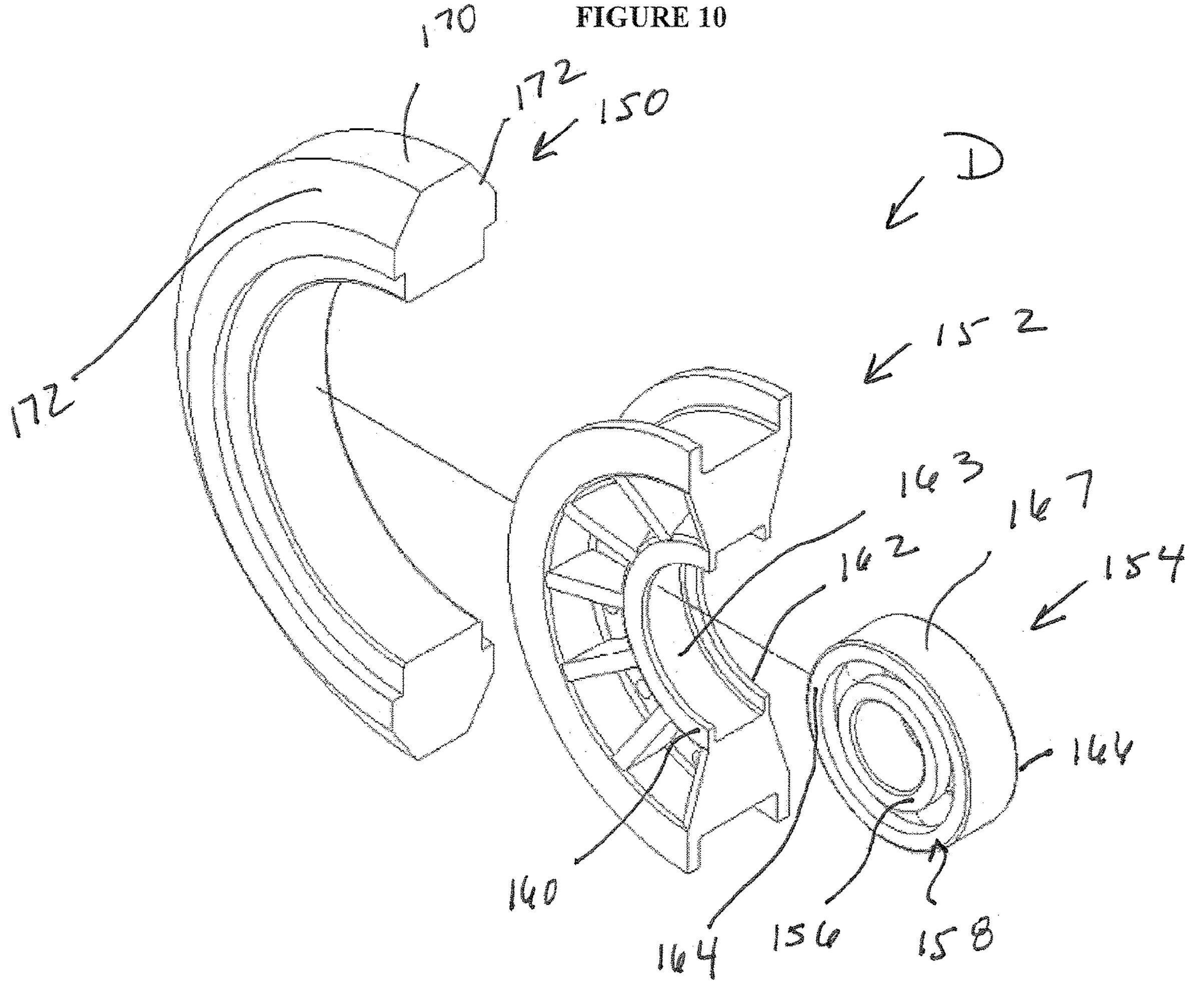
FIG. 10 is an exploded, fragmentary perspective view of a preferred roller/wheel.
Figure 11:
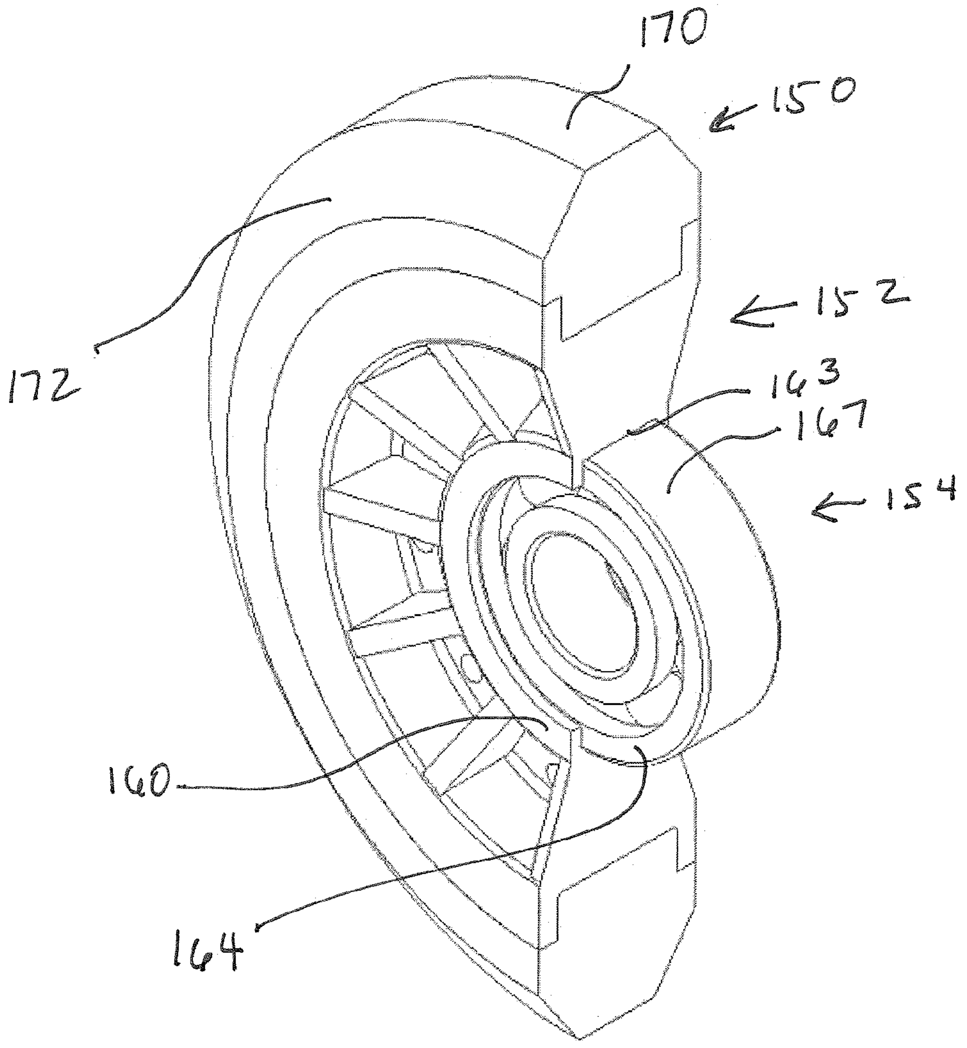
FIG. 11 is a fragmentary perspective view of a preferred roller/wheel.
Figure 12:
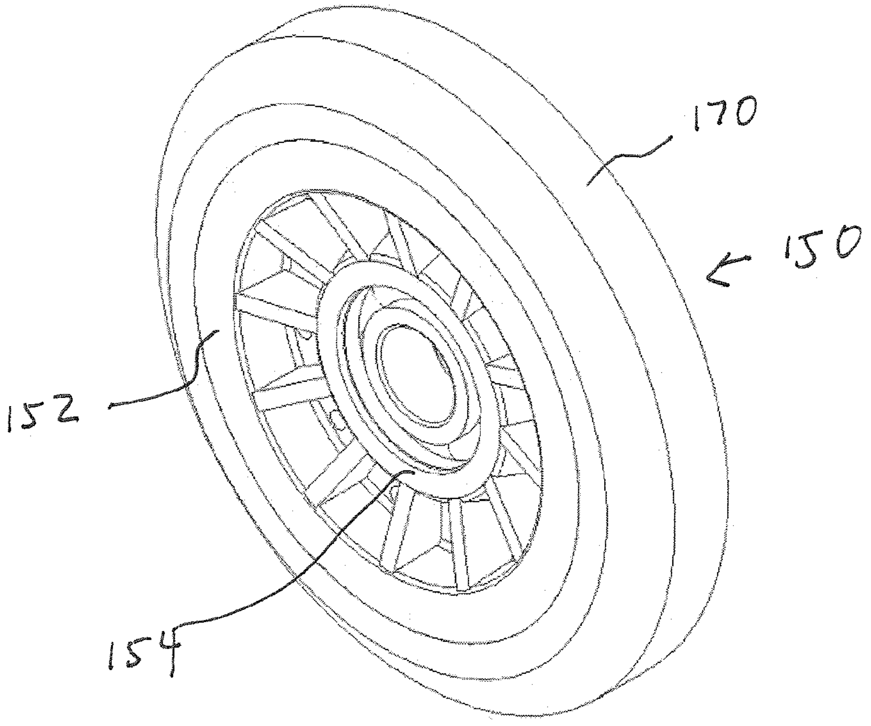
FIG. 12 is a perspective view of a preferred roller/wheel.

Referring to FIGS. 10 to 12, a preferred form of wheel/roller will now be described. Preferably, wheels/roller C and D are identical in construction. Therefore, only roller/wheel D will be described in detail. Roller/wheel D includes a tread 150, a non-metallic rim 152 and a bearing 154 having an inner race 156 mounted about the shaft of bolt 142 and an outer race 158 fixed to rim 152. Bearing 154 includes a plurality of bearing members positioned between inner race 156 and outer race 158 so that outer race 158 can rotate relative to inner race 156. Preferably, bearing 154 is attached to non-metallic rim 152 during formation of rim 152. For example, rim 152 can be formed from injection molding or other suitable molding process. Bearing 154 can be inserted into a form or mold utilized to form rim 152 by molding. Preferably, rim 152 is formed from a composite material. In a most preferred form, the composite material is a polyamide and fiberglass blend. However, rim 152 could be formed from a single material (e.g., polyamide or any other suitable material). During the molding process forming rim 152, rim 152 is preferably permanently fixed to outer race 158 so that rim 152 and outer race 158 move together. As seen in FIG. 10, rim 152 has inner sidewalls 160 and 162 formed about the sidewalls 164 and 166, respectively of outer race 158. Rim 152 further includes an inner cylindrical surface 163 extending between inner sidewalls 160 and 162 and formed about cylindrical surface 167 of outer race 158. The inner sidewalls 160 and 162 of rim 152 are preferably adhered to the sidewalls 164 and 166 of outer race 158, respectively during the molding process forming rim 152. Inner cylindrical surface 163 of rim 152 is preferably adhered to cylindrical surface 167 of outer race 158 during the molding process forming rim 152.

While the above described process of molding rim 152 results in rim 152 being formed as a single piece, rim 152 can be formed in multiple pieces (i.e., two or more pieces or parts) of a composite material and then attached to rim 152 after formation of the multiple pieces making up rim 152.

The cylindrical contact surface 170 of tread 150 is preferably formed with a roundness/circular dimension within a tolerance of 3 thousandths of an inch or less. The other dimensions of tread 150 and rim 152 are preferably formed within a tolerance of 10 thousandths of an inch or less. The inclined opposing sidewalls 172 of tread 150 extending downwardly at an angle from contact surface 170 are preferably equally spaced from a vertical plane passing through a center of tread 150.

Elevator guide A includes three independently adjustable systems that utilize a spring 68 to control movement of a corresponding wheel/roller away from a corresponding portion of an elevator rail. Support arm 50, roller D held by support arm 50 and spring 68 acting on support arm 50 form one independently adjustable system, support arm 52, roller C held by support arm 52 and spring 68 acting on support arm 52 form another independently adjustable system and support arm 54, roller D held by support arm 54 and spring 68 acting on support arm 54 form another independently adjustable system. Each of support arms 50, 52 and 54 is configured in the manner described above in connection with support arm 50 to vary the effective system spring rate of a given system merely by altering the vertical distance between spring 68 and the pivot point of the corresponding support arm which in turn alters the vertical distance of spring 68 from a center of a corresponding roller/wheel.

Specifically, if spring 68 and bolt 64 are connected to tower 12 and support arm 50 using opening 60 in support arm 50 and opening 74 in tower 12, the system including support arm 50 will have an effective system spring rate X. If spring 68 and bolt 64 are connected to tower 12 and support arm 50 using opening 58 in support arm 50 and opening 72 in tower 12, the system including support arm 50 will have an effective system spring rate Y. If spring 68 and bolt 64 are connected to tower 12 and support arm 50 using opening 56 in support arm 50 and opening 70 in tower 12, the system including support arm 50 will have an effective system spring rate Z. Effective system spring rate X is less than effective system spring rate Y and effective system spring rate Y is less than effective system spring rate Z, i.e., the closer spring 68 is to the pivot point of support arm 50 the less the effective system spring rate will be due to the resultant increase in the vertical distance/spacing of spring 68 from a center of wheel or roller D.

The preferred design of support arms 50, 52 and 54 also allows an individual to readily vary the effective system spring rate of each of the three above described systems merely by selecting different openings of the openings 56, 58 and 60 to connect spring 68 to support arm 52 and spring 68 to either of support arms 50 and 54. This is readily seen in FIG. 1, where spring 68 acting on support arm 52 utilizes the lower opening 60 and spring 68 acting on support arm 50 utilizes upper opening 56. The effective system spring rate of the system including support arm 52 is less than the effective system spring rate of the system including support arm 50 having a spring identical to the spring acting on support arm 52.

Bolt 116, resilient member 120 and nut 130 form an adjustable soft stop that limits the distance support arm 50 can move away from face 4 of rail member RR. By threading bolt 116 further into opening 95 of tower 12, one can readily lessen the distance between bolt head 118 and tower 12 which in turn lessens the distance support arm 50 can move away from support arm 50 when resilient member 120 is fully compressed. Further, by rotating the bolt in the opposite direction, one can readily increase the distance between bolt head 118 and tower 12 which in turn increases the distance support arm 50 can move away from support arm 50 when resilient member 120 is fully compressed. Resilient member 120 acts to cushion the impact of the stop as the resilient member preferably compresses approximately a quarter of an inch. However, the distance resilient member 120 can be compressed may be varied as desired. Accordingly, once support arm initially engages resilient member 120, support arm 50 can still move outwardly the distance or extent the resilient member 120 can fully compressed (e.g. a quarter of an inch).

Bolt 102, washer 104 and nut 103 form another adjustable hard stop that limits the distance support arm 50 can move away from face 4 of rail member RR. The stop formed by bolt 102, washer 104 and nut 103 is adjustable independent of the stop formed by bolt 116, resilient member 120 and nut 130.

The above two independently adjustable stops have differing stop action ranges (i.e., the stop action range is the range from initial contact of guide support arm with a stop portion of a corresponding adjustable stop to a final contact point at which movement of the guide support arm away from the corresponding face of the elevator rail is prevented by the corresponding adjustable stop). More specifically, the stop action range of the adjustable stop formed by bolt 102, washer 104 and nut 103 is less than the stop action range of the adjustable stop formed by bolt 116, resilient member 120 and nut 130. The stop action range of the adjustable stop formed by bolt 102, washer 104 and nut 103 will be very minimal as the only resilient or compressible element of this adjustable stop is a thin elastomeric layer/skin (e.g., 1/16 of an inch) applied or adhered to an inner face of washer 104. The stop action range of the adjustable stop formed by bolt 102, washer 104 and nut 103 could be less than a 1/16 of an inch or could be zero. The stop action range of the adjustable stop formed by bolt 116, resilient member 120 and nut 130, will be equal to or approximately equal to the distance resilient member 120 can be compressed.

The fact that the two stops described above can be independently adjusted is a significant advantage over previously known dual stops that cannot be independently adjusted, i.e., adjustment of one stop causes or results in adjustment of the other stop. Specifically, an elevator car has a range of motion which varies based on the design of an elevator. The range of motion of the elevator car must be controlled to prevent the car from impacting an object in the elevator car which could damage the elevator car and greatly reduce ride quality. Hard stops, i.e., stops having zero or very minimal stop action ranges can be used to restrict movement of the elevator car to prevent the elevator car from striking an object in an elevator shaft that could damage the elevator car. However, a hard stop will exert a significant and abrupt force on the elevator car adversely impacting ride quality of the elevator car. A soft stop, i.e., a stop having a sufficient action range (e.g., a quarter of an inch) will control movement of the elevator car by exerting a gradual force on the elevator car. However, due to the numerous different designs of elevators, the range of motion of a given elevator car varies. Hard and soft stops that have been previously used are not independently adjustable and, therefore, do not allow the necessary flexibility to set or orient the hard stop relative to the soft stop to achieve a superior ride quality while preventing damage to an elevator car to accommodate the varying conditions of elevators.

The independently adjustable soft and hard stops of the present invention provide a great deal of flexibility in setting and/or orienting the hard stop relative to the soft stop to ensure superior ride quality while preventing damage to an elevator car. For example, the soft stop of the subject invention (i.e., the stop formed by bolt 116, resilient member 120 and nut 130) can be set to be very close to or in contact with support arm 50 to accommodate those instances where greater control on the support arm 50 is desired. In prior art devices, inward movement of the soft stop to be close to or in contact with the support arm would move the hard stop unnecessarily close to support art 50 so that the frequency support arm 50 impacts the hard stop would increase considerably significantly reducing ride quality as the hard stop exerts a significant and abrupt force on the elevator car. Because the hard stop of the preferred embodiment (i.e., the stop formed by bolt 102, washer 104 and nut 103) can be adjusted independent of the soft stop, the hard stop can be positioned a sufficient distance from support arm 50 that will prevent the elevator car from being damaged while significantly reducing the frequency that support arm 50 impacts the hard stop. This is just one of many instances where the independently adjustable stops of the preferred embodiment can be used to significantly improve ride quality.

The independently adjustable stops of the preferred embodiment also allow the soft stop to be positioned relative to the hard stop so that the only time arm 50 would impact the hard stop is if the soft stop became damaged where the soft stop could function as a stop to prevent damage to the elevator car.

The independently adjustable stops of the preferred embodiment further allow the hard stop to be positioned relative to soft stop to vary the extent to which the resilient member 120 of the soft stop can compress. For example, where resilient member 120 can be compressed by W, but in a particular application or environment in which roller guide A is used, resilient member 120 should only be compressed a fraction of W, the hard stop can be set to prevent any further outward movement of arm 50 once resilient member 120 has been compressed the desired fraction of W.

The independently adjustable stops of the preferred embodiment further allow adjustment of the stops so that the stops can act in parallel or series and/or a combination of series and parallel.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

We claim:

1. An elevator guide configured to ride along an elevator rail, the elevator guide comprising:

(a) a base configured to be attached to a component that rides on one or more elevator rails, a first guide configured to ride along a corresponding surface of a rail member of the elevator rail, a first spring biasing said first guide in contact with said corresponding surface of the rail member of the elevator rail and a first guide support member having a connection portion rotatably connected to said base so that said first guide support member can rotate about an axis relative to said base, said first guide support member further including a guide connection portion for connecting the first guide support member to said first guide for movably supporting said first guide on said base so that said first guide can move toward and away from the corresponding surface of the rail member of the elevator rail; and, (b) said first guide support member being configured to allow a position that said first spring contacts said first guide support member to be varied along a longitudinal axis of said first guide support member to vary a system effective spring rate.

2. The elevator guide of claim 1, wherein:

(a) said first guide is a roller.

3. The elevator guide of claim 2, wherein:

(a) said first spring is mounted about a bolt and said first guide support member includes a plurality of openings wherein each of the plurality of openings are configured to receive the bolt having said first spring mounted about the bolt to vary a system effective spring rate.

4. The elevator guide of claim 3, wherein:

(a) said first spring is a coil spring.

5. An elevator guide configured to ride along an elevator rail, the elevator guide comprising:

(a) a base configured to be attached to a component that rides on one or more elevator rails, said base having a notch extending through a front face of said base to receive a portion of a rail member of the elevator rail, said notch having a rear face, a first side face and a second side face, said first side face being spaced from said second side face a first distance, said bottom of said base having an adjustment recess extending along said rear face, said first side face and said second side face of said notch, said adjustment recess having a width defined by the portions of the adjustment recess extending along said first side face and said second side face of the notch, the width being greater than said first distance, a first guide configured to ride along a corresponding surface of a rail member of the elevator rail, a first biasing member biasing said first guide in contact with said corresponding surface of the rail member of the elevator rail and a first guide support member having a connection portion connected to said base so that said first guide support member can move relative to said base, said first guide support member further including a guide connection portion for connecting the first guide support member to said first guide for movably supporting said first guide on said base so that said first guide can move toward and away from the corresponding surface of the rail member of the elevator rail; and, (b) a notch adjustment member operably associated with said adjustment recess of said base for adjusting at least one dimension of the base relative to the rail member of the elevator rail, wherein a first portion of said notch adjustment member is disposed in said adjustment recess.

6. The elevator guide of claim 5, wherein:

(a) a second portion of said notch adjustment member extends into said notch; and, (b) said notch of said base having at least one alignment member formed in a vertically extending face of said notch for aligning the rail member relative to the base, and wherein said notch adjustment member when attached to said base is vertically offset from said at least one alignment member so that said at least one alignment member is readily visible after said notch adjustment member is attached to said base.

7. The elevator guide of claim 6, wherein:

(a) said adjustment recess is substantially U-shaped, said notch is substantially U-shaped and said notch adjustment member is substantially U-shaped.

8. The elevator guide of claim 7, wherein:

(a) said notch adjustment member has a width greater than a width of said notch and a depth greater than a depth of said notch.

9. The elevator guide of claim 8, wherein:

(a) said notch adjustment member is detachably connected to a bottom of said base and adjusts a plurality of dimensions of the base relative to the elevator rail.

10. An elevator roller guide configured to ride along an elevator rail, the elevator roller guide comprising:

(a) a base configured to be attached to a component that rides on one or more elevator rails, a roller configured to ride along a corresponding surface of a rail member of the elevator rail, a spring biasing said roller in contact with said corresponding surface of the rail member of the elevator rail;

(b) said roller guide further including at least one of the following:

(i) a roller support member operably associated with said roller for movably supporting said roller so that said roller can move toward and away from a corresponding surface of the rail member wherein said roller support member has a plurality of spring engagement sections configured to allow a position that the spring contacts said roller support member to be varied to vary a system effective spring rate;

(ii) the roller including a roller tread and a non-metallic rim molded about a roller bearing and configured to receive the roller tread and the roller tread being mounted on the non-metallic rim, the roller tread having a contact surface configured to contact the corresponding surface of the rail member; and (iii) a first stop and a second stop that are independently adjustable and operably associated with a roller support supporting said roller to control movement of said roller; and, (iv) an opening adjustment member detachably connected to a base of the roller guide about a notch formed in the base of the roller guide to receive a portion of the rail member of the elevator rail to vary the distance between the base of the roller guide and a portion of the rail member of the elevator rail, a portion of the opening adjustment member is disposed in an adjustment recess formed in the base of the roller guide, wherein the adjustment recess has a width greater than a width of said notch.

11. The elevator roller guide of claim 10, wherein:

(a) said elevator roller guide includes the roller having the non-metallic rim molded about the roller bearing and configured to receive the roller tread and the roller tread mounted on the non-metallic rim, the roller tread having the contact surface configured to contact the corresponding surface of the rail member, said non-metallic rim is formed from a composite material.

12. The elevator roller guide of claim 11, wherein:

(a) said elevator roller guide further includes the opening adjustment member.

13. The elevator roller guide of claim 12, wherein:

(a) said elevator roller guide further includes a roller support member operably associated with said roller for movably supporting said roller so that said roller can move toward and away from a corresponding surface of the rail member wherein said roller support member has a plurality of spring engagement sections configured to allow a position that the spring contacts said roller support member to be varied to vary a system effective spring rate.

14. The elevator roller guide of claim 13, wherein:

(a) said elevator roller guide further includes a first stop and a second stop that are independently adjustable and operably associated with the roller support.

15. The elevator roller guide of claim 11, wherein:

(a) the composite material is a polyamide and fiberglass blend.

* * * * *